(12) United States Patent
Pisenti et al.

(10) Patent No.: US 11,561,148 B2
(45) Date of Patent: Jan. 24, 2023

(54) TECHNIQUES FOR MEASURING COLLISION RATE WITH SPATIAL FILTERING OF SCATTERED LIGHT

(71) Applicant: IonQ, Inc., College Park, MD (US)

(72) Inventors: Neal Pisenti, Baltimore, MD (US); Kenneth Wright, Berwyn Heights, MD (US); Jason Madjdi Amini, Takoma Park, MD (US); Jwo-Sy Chen, Greenbelt, MD (US)

(73) Assignee: IonQ, Inc., College Park, MD (US)

( * ) Notice: Subject to any disclaimer, the term of this patent is extended or adjusted under 35 U.S.C. 154(b) by 313 days.

(21) Appl. No.: 17/072,916

(22) Filed: Oct. 16, 2020

(65) Prior Publication Data
US 2022/0120629 A1    Apr. 21, 2022

Related U.S. Application Data

(60) Provisional application No. 62/932,807, filed on Nov. 8, 2019.

(51) Int. Cl.
*G01L 21/30* (2006.01)
*G06N 10/00* (2022.01)

(52) U.S. Cl.
CPC .............. *G01L 21/30* (2013.01); *G06N 10/00* (2019.01)

(58) Field of Classification Search
CPC .......... G01L 21/30; G06N 10/00; G06N 10/40
See application file for complete search history.

(56) References Cited

U.S. PATENT DOCUMENTS

| | | | |
|---|---|---|---|
| 8,637,817 B1 * | 1/2014 | Krutchinsky | H01J 49/4225 |
| | | | 250/281 |
| 2003/0094572 A1 * | 5/2003 | Matsui | H01J 37/28 |
| | | | 250/306 |
| 2022/0137390 A1 * | 5/2022 | Kim | G06N 10/00 |
| | | | 250/334 |

* cited by examiner

*Primary Examiner* — Dominic E Hawkins
(74) *Attorney, Agent, or Firm* — ArentFox Schiff LLP

(57) ABSTRACT

Aspects of the present disclosure describe techniques for measuring collision rate with spatial filtering of scattered light. For example, a method for characterizing vacuum in a chamber is described that includes generating, inside the chamber, a potential well having a single, shallow potential region within which an ion is trapped, the shallow potential region having a lowest potential of the potential well, optically monitoring the ion within the potential well, detecting, based on the optically monitoring, a movement of the ion away from the shallow potential region in response to a collision with a background gas, and determining a pressure inside the chamber based on a rate of detected movements of the ion.

29 Claims, 8 Drawing Sheets

TECHNIQUES FOR MEASURING COLLISION RATE WITH SPATIAL FILTERING OF SCATTERED LIGHT

CROSS-REFERENCE TO RELATED APPLICATIONS

The current application claims priority to U.S. Provisional Application No. 62/932,807 filed on Nov. 8, 2019, entitled "TECHNIQUES FOR MEASURING COLLISION RATE WITH SPATIAL FILTERING OF SCATTERED LIGHT," the contents of which are hereby incorporated by reference in their entireties.

BACKGROUND

Aspects of the present disclosure relate generally to measuring collision rates, and more specifically, to techniques for measuring collision rates with spatial filtering of scattered light in atom-based systems.

The characterization of ultra-high vacuum (UHV) is important for many applications which require UHV environments to operate, such as atom-based implementations of quantum computing or precision measurement experiments. In the context of quantum computing, collisions between qubits and background gas species can destroy the computation, and lead directly to infidelity in the result. Some collisions might also result in loss of the qubits, and require a time-intensive reloading procedure to repopulate the qubits before additional calculations can be performed. For precision measurement applications, such as the operation of atomic clocks, precise characterization of the local vacuum environment is required to calibrate systematic shifts in the operation of the clock. Thus, in both quantum computing and precision measurements, an accurate measure of the local pressure will inform design choices to achieve lower pressure vacuum environments, and place numeric limits on the performance of a particular device due to background gas collisions (e.g., limit computation time based on the time between collisions).

Several methods exist to measure vacuum pressure and/or collision rate, but they all suffer from various drawbacks. It is therefore desirable to implement new techniques for measuring the collision rate between background gasses and a trapped ion.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method for characterizing vacuum in a chamber is described that includes generating, inside the chamber, a potential well having a single, shallow potential region within which an ion is trapped, the shallow potential region having a lowest potential of the potential well, optically monitoring the ion within the potential well, detecting, based on the optically monitoring, a movement of the ion away from the shallow potential region in response to a collision with a background gas, and determining a pressure inside the chamber based on a rate of detected movements of the ion.

In another aspect of this disclosure, a system for characterizing vacuum in a chamber is described that includes a controller configured to generate, inside the chamber, a potential well having a single, shallow potential region within which an ion is trapped, the shallow potential region having a lowest potential of the potential well, an imaging system configured to optically monitor the ion within the potential well, and to detect, based on the optically monitoring, a movement of the ion away from the shallow potential region in response to a collision with a background gas, a processor configured to determine a pressure inside the chamber based on a rate of detected movements of the ion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, several methods exist to measure vacuum pressure and/or collision rate in atom-based implementations of quantum computing or precision measurement experiments, but they all suffer from various drawbacks. For example, there exist several vacuum gauge technologies, which work in different pressure regimes. For UHV, typically a Bayard-Alpert ion gauge is used. However, this gauge suffers from calibration offsets which make it unreliable as a measure of absolute pressure at sufficiently low vacuum. Additionally, it must be placed far from the atoms used for the computations or experiments and thus does not probe a localized pressure where one is needed for accuracy.

Figure 1:
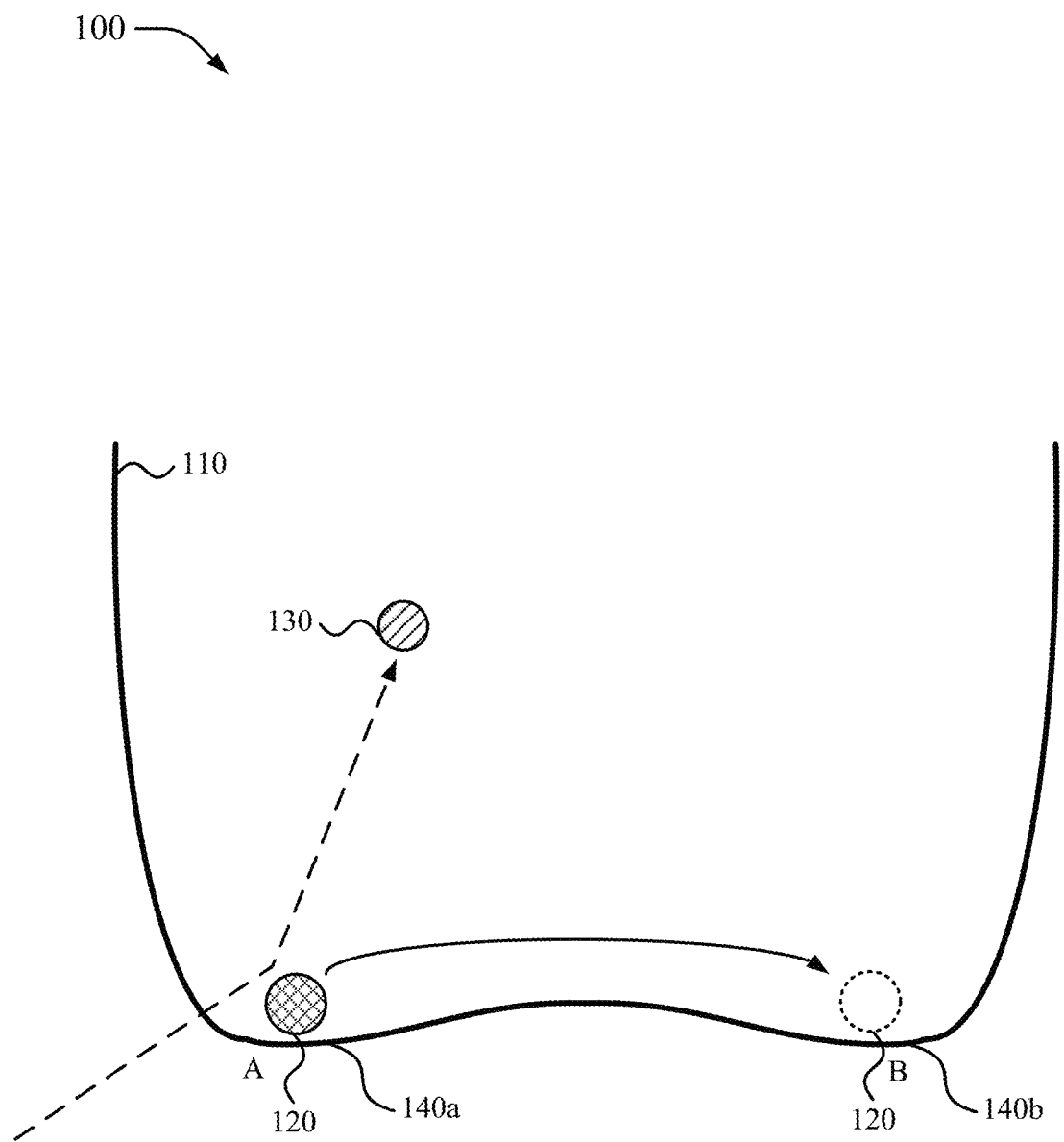
FIG. 1 illustrates an example of a potential for performing a hopping rate measurement in accordance with aspects of the disclosure.

In other examples, there are several direct measurements of pressure that are used to probe the collision rate at the sample location. Hoping rate measurement is one of these techniques. In hopping rate measurement, the local potential energy in an ion trap may be controlled to construct a potential such as the one shown in a diagram 100 in FIG. 1. In a potential 110 an ion 120 is either localized in the left (position A in a potential well 140a) or the right (position B in a potential well 140b) of the potential 100. In this example, the ion 120 is localized in the left.

If a collision occurs that transfers enough energy from a background gas molecule 130 to the ion 120 to overcome the barrier between the two wells, when it re-localizes it will be found in either the left or the right well. In this example, the ion 120 can re-localize in potential well 140b after moving out from potential well 140a. In an ideal potential, there is a 50% chance for it to end up on one side or the other. By repeatedly measuring the position of the ion and recording how often it "hops" from one well to the other, one can extract a collision rate. This kind of measurement has several disadvantages. For example, changing stray electric fields will distort the well, changing the probability of finding the ion in a different position after a collision. Additionally, as the barrier height becomes low enough for this method to work, the sensitivity to stray fields increases dramatically and it becomes technically very challenging to maintain the proper well structure. Interpretation of the results requires a good model of the potential energy structure, which may not be readily available.

Another example of direct measurements is dark rate formation. It is possible to trap a long chain of ions, and measure the rate at which the ions go dark due to a collision event. This could be due to, e.g., hydride formation, or optical shelving in a metastable dark state. To extract a collision rate, a detailed model of the reaction rate is needed, which may or may not exist at sufficient levels of precision. Additionally, not every collision results in a dark-ion event, so the statistics are limited for finite integration time.

Yet another example of direct measurements is chain reordering. Similar to the hopping rate measurement described above a chain of ions can be trapped to then record how frequently the chain reorders. This similarly requires a detailed model of the configuration-space potential energy, and the different chain configurations must be degenerate but separated by an energy barrier of known height. Deviations from ideal conditions assumed by the model will distort the results of the measurement, which presents additional technical challenges.

In contrast to the techniques described above, this disclosure describes a more effective technique for measuring the collision rate between background gasses and a trapped ion. In this technique, the ion is trapped in a shallow potential along one or more dimensions, and Doppler cooling light is collected continuously through a spatially selective imaging apparatus. A collision event can be detected when the collected photon flux decreases momentarily in response to the ion entering a more energetic trajectory after a collision event. In contrast to previous techniques, this approach is insensitive to the precise details of the confining potential (e.g., the overall shape of the potential). Modifications to the technique are described in more detail below that allow for additional information, such as the collision rate as a function of energy, to be extracted as well.

Figure 2A:
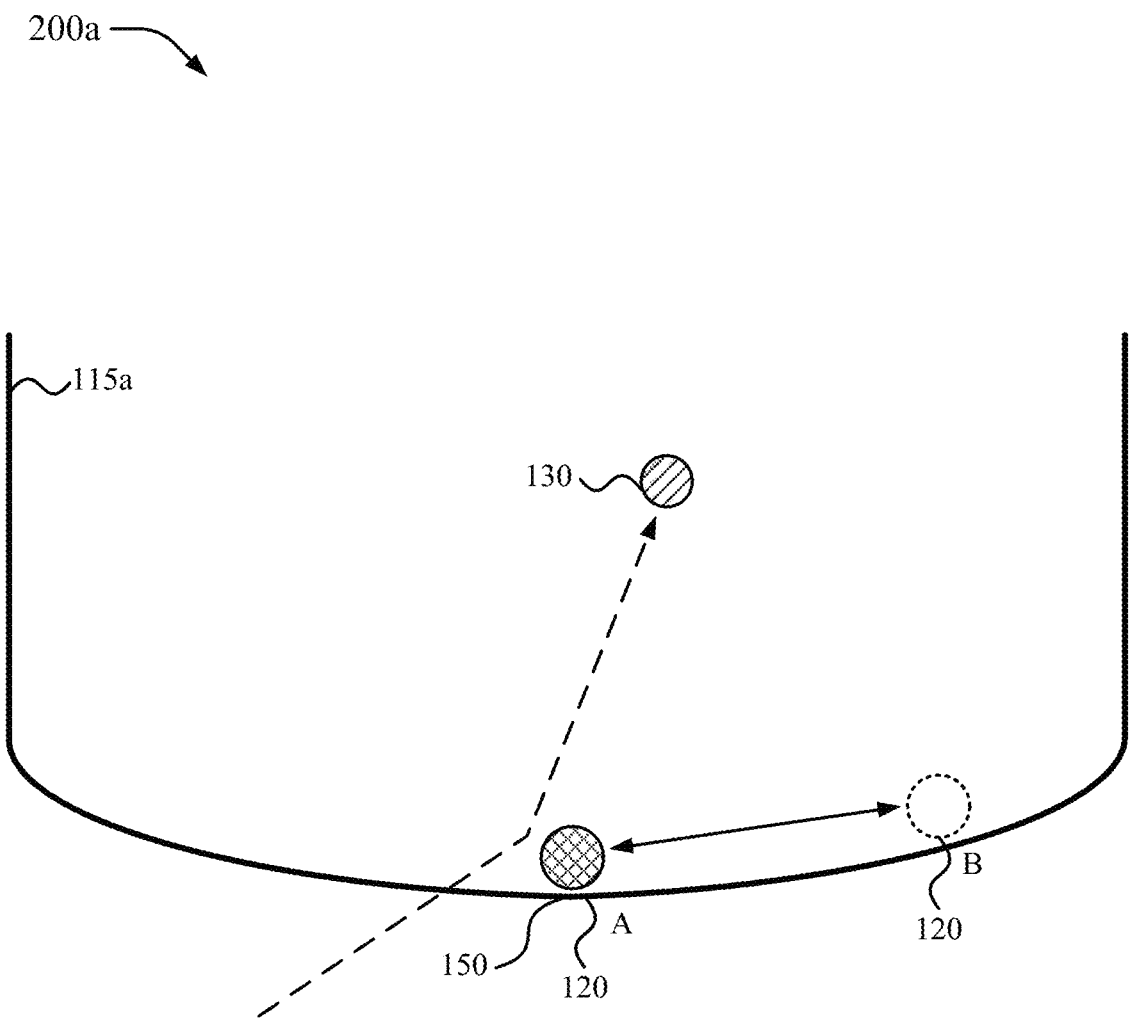
FIG. 2A illustrates an example of a potential with a shallow potential region for collision rate measurement in accordance with aspects of the disclosure.
Figure 2B:
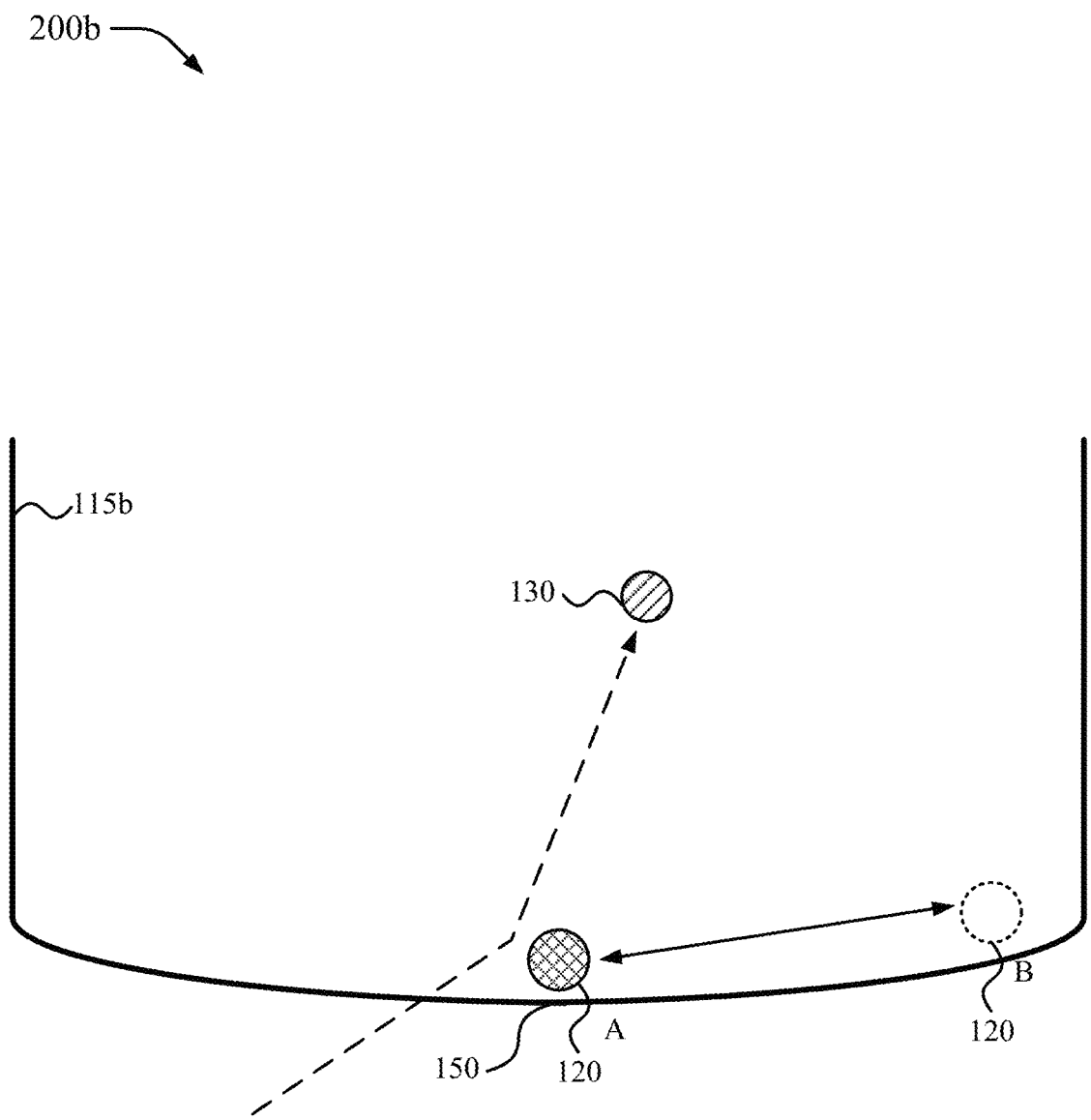
FIG. 2B illustrates another example of a potential with a shallow potential region for collision rate measurement in accordance with aspects of the disclosure.

In this technique, a single ion may be trapped in a highly asymmetric trap, such that the ion is tightly confined along two radial directions, but only weakly confined along an axial direction, such as is the case for a linear RF Paul trap (see e.g., FIGS. 2A and 2B). Photons emitted from the ion may be coupled into a spatially-selective imaging device, such as an optical fiber, with sufficient magnification that small displacements of the ion position along the weak axial trap dimension decouples light from the collection apparatus (see e.g., FIG. 3A). After a collision, the ion is kicked momentarily into a high-energy orbit in the trap, which can be detected as a momentary drop in the photon collection rate (see e.g., FIG. 3B). The number of such events is monitored to extract or determine a collision rate. This measurement technique does not suffer from the drawbacks discussed above in connection with other techniques and is generally insensitive to the exact details of the trap.

This can be extended by placing the ion in an anharmonic axial potential, and driving a small-amplitude modulation to the electric field at a particular frequency. Depending on the momentum transferred during a collision, the ion will be kicked into a meta-stable orbit which does not undergo full damping due to the Doppler cooling. This will be detected as a prolonged drop in the photon collection rate; the ion can then be "reset" by turning off the modulation and allowing it to cool back to its equilibrium position. By scanning the frequency of the small-amplitude modulation, it is possible to map the collision rate as a function of energy.

From the collision rate found using the techniques described above, it is then possible to apply known models to extract or determine the local pressure if desired.

This description is an example of one such implementation of the technique. Other implementations might include the use of time-tagged photon arrival statistic, down-sampling of photon counts by recording the mean/min/max photon count in a particular integration window, measurement of the ion position or brightness on a camera as a method of spatial filtering, or a multi-channel photomultiplier tube (PMT), or other method of spatial filtering. Other aspects to be included in this and other implementations include post-processing steps to filter data against false detection events, varying the Doppler cooling power, varying the trap potential (DC or RF), and or variations on the trap style or geometry.

Further details regarding the techniques described above are provided next in connection with FIGS. 2A-6.

As described above, trapped atoms may be used in atom-based implementations of quantum computations and precision measurement experiments. As used in this disclosure, the terms "atomic ions," "atoms," and "ions" may be used interchangeably to describe the particles that are to be confined, or are actually confined, in a trap. The typical ion trap geometry or structure used for quantum computing and experimental purposes is the linear radio frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. Atomic ions can be laser-cooled to very low temperatures in such a trap.

Using a trap such as a linear Paul trap, for example, FIG. 2A illustrates a diagram 200a that shows an example of a potential with a shallow potential region for collision rate measurement in accordance with aspects of the disclosure. In this example, a potential or potential well 115a is shown having a single, shallow potential region 150 within which the ion 120 is trapped, the shallow potential region 150 having a lowest potential of the potential well. A bottom portion of the potential well 115a is mostly flat with the shallow potential region 150 at or near a center of the potential well 115a. In one example, the ion 120 may be trapped by in one or more radial directions (in and out of FIG. 2A), but only weakly confined along an axial direction (left and right of FIG. 2A). It is to be understood that the size and shape of the potential wells and the shallow potential regions in the various diagrams described herein are provided by way of illustration and in some instances may be exaggerated to facilitate viewing.

Upon a collision between the ion 120 and the background gas molecule 130, the ion 120 kicked into an energetic orbit (see e.g., FIG. 3B) along the weak confinement which may have the ion 120 move from a position A at the shallow potential region 150 to as far as a position B in the energetic orbit. At a later time, the ion 120 may reset back to the shallow potential region 150.

FIG. 2B illustrates a diagram 200b of another example of a potential with a shallow potential region for collision rate measurement in accordance with aspects of the disclosure. In this example, a potential or potential well 115b is shown that also has the single, shallow potential region 150 but with a flatter bottom portion than that of the potential well 115a. In this example, when the ion 120 is kicked into the energetic orbit it may be moved farther out than in the potential well 115a because of the flat configuration of the bottom of the potential well 115b. As long as the potential well 115b is configured such that it allows for the ion 120 to reset back into the shallow potential region 150, then having a substantially flatter bottom than the potential well 115a may simply affect the extent of the energetic orbit within the potential well but not the overall collision rate measurement technique.

Figure 3A:
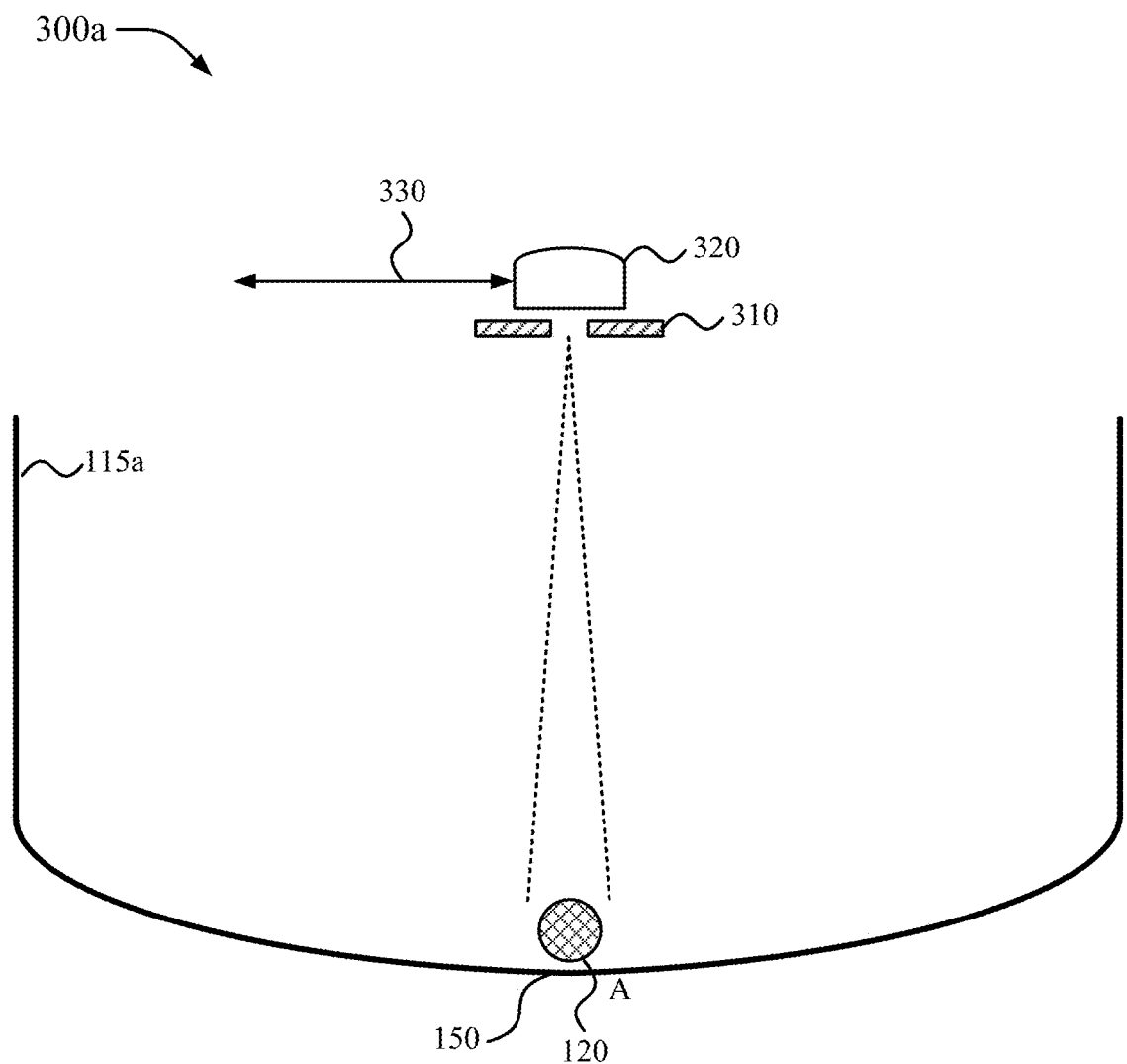
FIG. 3A illustrates an example of an ion trapped in a weak trap along a horizontal direction in accordance with aspects of the disclosure.

FIG. 3A illustrates a diagram 300a of an example of an ion trapped in a weak trap along a horizontal direction in accordance with aspects of the disclosure. As described above, and using the potential well 115a of FIG. 2A (although the potential well 115b of FIG. 2B is also suitable), the ion 120 is monitored by an imaging apparatus 320. The imaging apparatus 320 may monitor a photo count of photons emitted by the ion 120 while in the shallow potential region 150. These photons may be emitted in response to a cooling of the ion 120 (e.g., by Doppler cooling). The photons are collected through an aperture or spatial filter 310 and the photon count is provided by some form of communication 330 to a device that can electronically record or track the photon count (see e.g., processor 545 in FIG. 5). In this example, the ion 120 is localized entirely within the field of view of the imaging apparatus 320 and the spatial filter 310. The imaging apparatus 320 may be part of an imaging system (see e.g., FIG. 5).

Figure 3B:
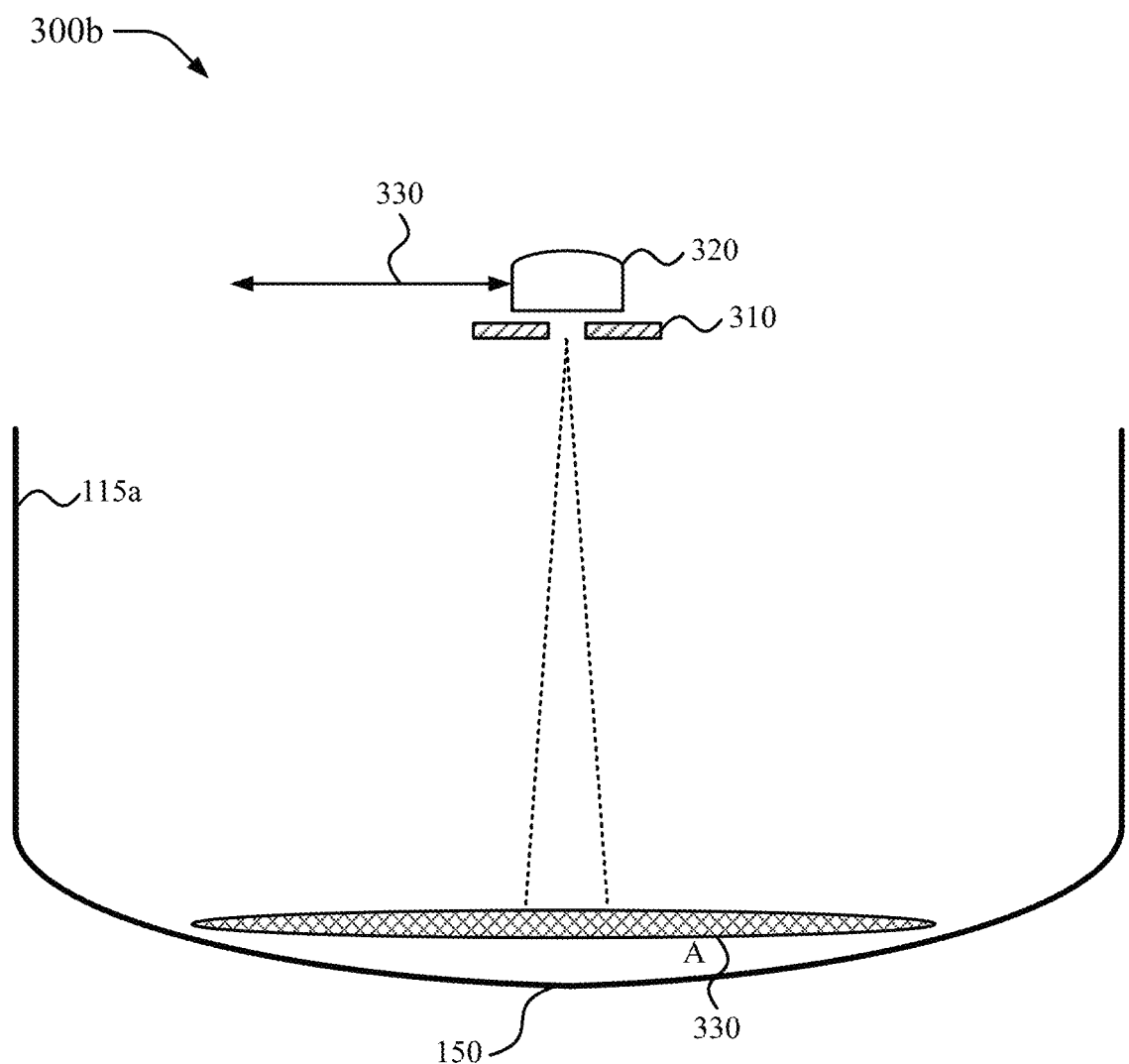
FIG. 3B illustrates an example of the ion trapped in FIG. 3A immediately after a collision in accordance with aspects of the disclosure.

In FIG. 3B, however, a diagram 300b illustrates an example of the ion trapped in FIG. 3A immediately after a collision in accordance with aspects of the disclosure. In this case, the photon count produced by the imaging apparatus 320 is lowered immediately after the collision. That is, in response to the collision, the ion 120 is kicked into an energetic orbit 330, and many of the scattered photons fall outside the field of view of the spatially selective imaging apparatus 320. Thus, the recorded photon count will decrease immediately following a collision event, until the ion 120 has been cooled back to its equilibrium position represented in FIG. 3A.

By detecting these changes in the light emitted by the ion 120 (e.g., the photon count) it is then possible to identify various collision events between background gas and the ion 120. The rate at which these collisions occur can therefore be measured and such measurements used to extract or determine the pressure at exactly the location of the trap that is being used to confine the ion 120.

Figure 4:
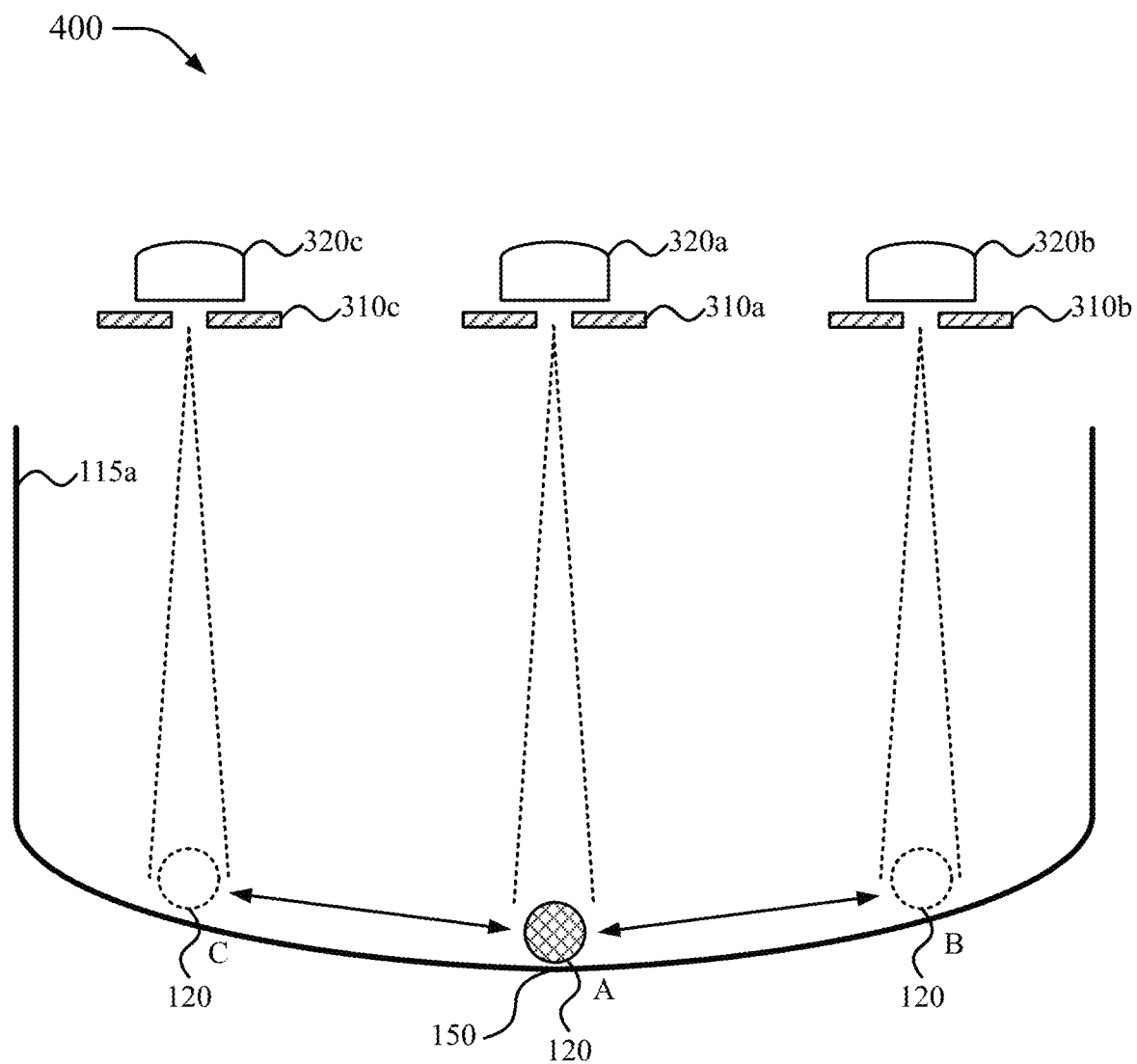
FIG. 4 illustrates an example of multiple imaging systems being used to monitor collisions with a trapped ion in accordance with aspects of the disclosure.

FIG. 4 illustrates diagram 400 that shows an example of using multiple imaging systems being used to monitor collisions with a trapped ion in accordance with aspects of the disclosure. In this example, multiple imaging systems 320a, 320b, and 320c and their spatial filters 310a, 310b, and 310c, corresponding to different positions of the ion 120 in the potential well 115a, are shown. When the ion 120 is kicked into an energetic orbit, the imaging systems may be sufficiently sensitive to determine the presence of the ion 120 and a time at which the presence was detected. With this information about the photon count, the time, and the position, it may be possible to determine not only that a collision event took place but also the energy of that collision event and the masses of the background gas species involved in the collisions by monitoring the timing of the photons detected in the multiple imaging systems 320a, 320b, and 320c. In some implementations, the masses of one or more background gas species may be determined using the techniques described herein.

Figure 5:
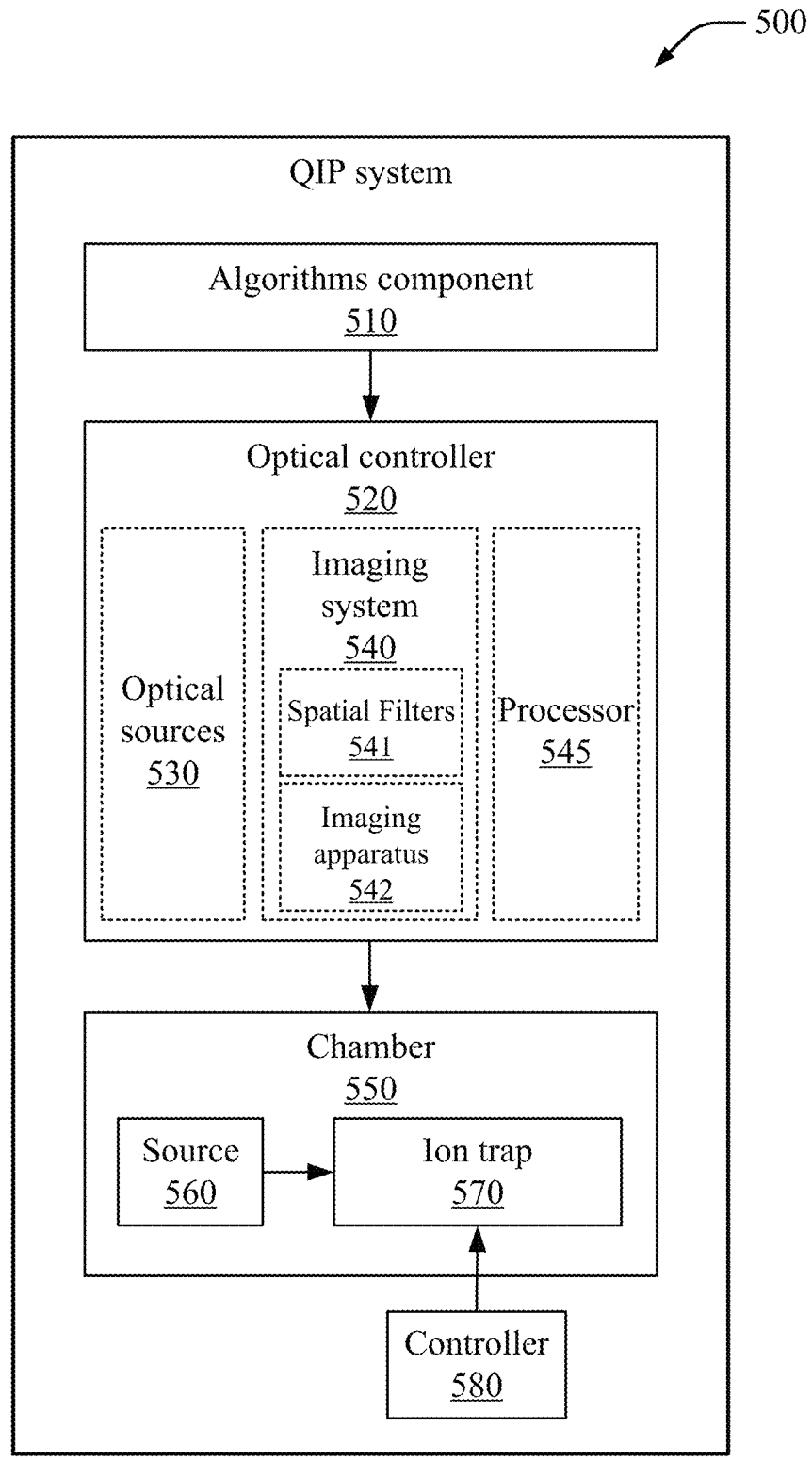
FIG. 5 is a block diagram that illustrates an example of a quantum information processing (QIP) system in accordance with aspects of this disclosure.

FIG. 5 is a block diagram that illustrates an example of a QIP system 500 in accordance with aspects of this disclosure. The QIP system 500 may also be referred to as a quantum computing system, a computer device, or the like. In an aspect, the QIP system 500 may be used to perform quantum computations and experiments, and also to measure a collision rate that allows for control of certain features of the quantum computations and experiments (e.g., how long they can run before a collision causes an issue).

The QIP system 500 can include a source 560 that provides atomic species (e.g., a flux of neutral atoms) to a chamber 550 having an ion trap 570 that traps the atomic species once ionized (e.g., photoionized) by an optical controller 520. A controller 580 may be used to control the ion trap 570 to generate the appropriate potentials, including the potential wells described herein to perform collision rate measurements. Optical sources 530 in the optical controller 520 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 540 in the optical controller 520, and/or to perform the optical control functions described in this disclosure. In an aspect, the optical sources 530 may be implemented separately from the optical controller 520.

The imaging system 540 can include a high resolution imager (e.g., CCD camera—not shown) for monitoring the atomic ions while they are being provided to the ion trap or after they have been provided to the ion trap 570. In an aspect, the imaging system 540 can be implemented separate from the optical controller 520, however, the use of fluorescence to detect, identify, and label atomic ions using image processing algorithms may need to be coordinated with the optical controller 520.

The imaging system 540 can include one or more imaging apparatus 542 in the form of optical fibers to collect photon count when making collision rate measurements. The imaging system 540 may include one or more spatial filters 541 to enable a localized field of view for when making collision rate measurements. The imaging apparatus 320 in FIGS. 3A and 3B, and the imaging apparatus 320*a*, 320*b*, and 320*c* in FIG. 4 may be examples of the imaging apparatus 542. Similarly, the spatial filters 310 in FIGS. 3A and 3B, and the spatial filters 310*a*, 310*b*, and 310*c* in FIG. 4 may be examples of the spatial filters 541.

The optical controller 520 can include a processor 545 to control various aspects of the collision rate monitoring and/or to process photon counts to determine a collision rate, from which it can also determine a local pressure. The processor 545 need not be implemented as part of the optical controller 520 and may be implemented in other components of the QIP system 500 or separate from the QIP system 500.

The QIP system 500 may also include an algorithms component 510 that may operate with other parts of the QIP system 500 (not shown) to perform quantum algorithms or quantum operations, including a stack or sequence of combinations of single qubit operations and/or multi-qubit operations (e.g., two-qubit operations) as well as extended quantum computations. As such, the algorithms component 510 may provide instructions to various components of the QIP system 500 (e.g., to the optical controller 520) to enable the implementation of the quantum algorithms or quantum operations.

Figure 6:
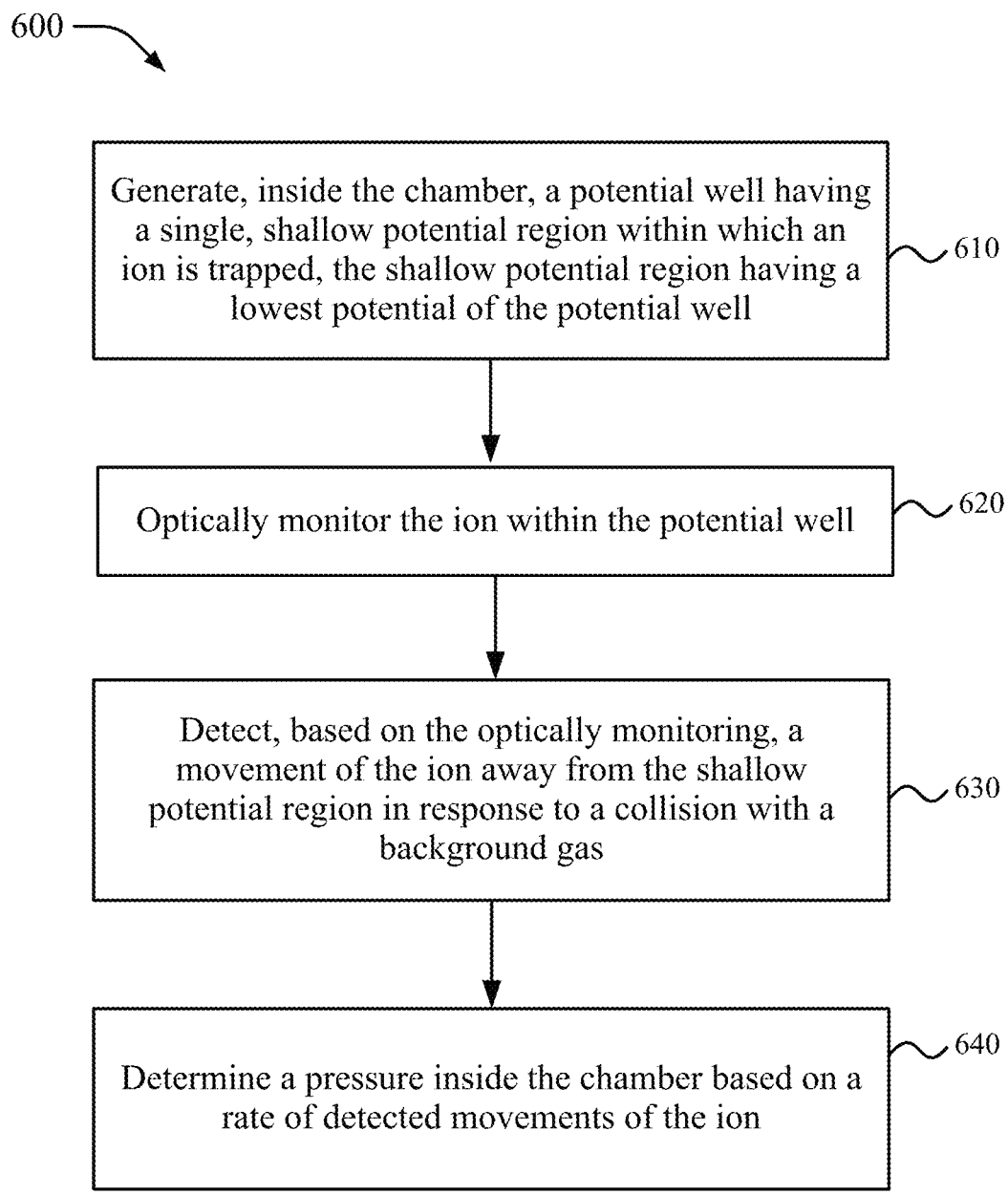
FIG. 6 is a flow diagram that illustrates an example of a method in accordance with aspects of this disclosure.

Referring to FIG. 6, a method 600 characterizing vacuum in a chamber by collision rate measurements is described. The functions of the method 600 may be performed by one or more components of a QIP system such as the QIP system 500 and its components (e.g., the optical controller 520 and its subcomponents, the ion trap 570).

At 610, the method 600 includes generating, inside the chamber (e.g. in the ion trap 570 of the chamber 550), a potential well having a single, shallow potential region (e.g., the shallow potential region 150) within which an ion is trapped (e.g., the potential well 115*a*, the potential well 115*b*, the shallow potential region having a lowest potential of the potential well (see e.g., FIGS. 2A and 2B).

At 620, the method 600 includes optically monitoring (e.g., by using imaging systems and spatial filters) the ion within the potential well.

At 630, the method 600 includes detecting, based on the optically monitoring, a movement of the ion away from the shallow potential region (e.g., into an energetic orbit) in response to a collision with a background gas.

At 640, the method 600 includes determining a pressure inside the chamber based on a rate of detected movements of the ion (e.g., the processor 545 may determine a collision rate from the photon count indicating movement of the ion, and then determine a pressure from the collision rate).

In an aspect of the method 600, generating the potential well includes controlling electric fields in a trap inside the chamber to produce the potential well.

In an aspect of the method 600, the shallow potential region is at a center of the potential well.

In an aspect of the method 600, the shallow potential region is configured to trap the ion in one or more dimensions.

In an aspect of the method 600, the potential well has a confining potential profile such that the ion returns to the shallow potential region after moving away (e.g., after moving into an energetic orbit) in response to a collision.

In another aspect of the method 600, the optically monitoring of the ion includes spatially filtering, at a location corresponding to the shallow potential region, a light (e.g., photons) produced by the ion in response to cooling of the ion, and the detecting, based on the optically monitoring, includes detecting a change in the spatially filtered light (e.g., a change in the photo count) at the location corresponding to the shallow potential region in response to the ion moving away from or back to the shallow potential region (e.g., ion being kicked into an energetic orbit and then cooling back to its equilibrium position (e.g., at the shallow potential region).

In an aspect of the method 600, the cooling of the ion is a Doppler cooling of the ion.

In an aspect of the method 600, an imaging system (e.g., the imaging systems or apparatus 320, such as an optical fiber) receives the spatially filtered light and detects the changes in the spatially filtered light (e.g., provides a photon count, or change in photo count, to the processor 545).

In an aspect of the method 600, generating, by the imaging system, an indication that a collision with the ion has occurred in response to detecting a change in the spatially filtered light (e.g., the imaging apparatus 320 may provide a signal representative of a change in the photon count to the processor 545).

In another aspect of the method 600, the optically monitoring of the ion includes spatially filtering, at multiple locations within the potential well including a location corresponding to the shallow potential region, a light produced by the ion in response to cooling of the ion (see e.g., FIG. 4), and the detecting, based on the optically monitoring, includes detecting a change in the spatially filtered light at one or more of the locations within the potential well in response to the ion moving away from or back to the shallow potential region. The method 600 further includes identifying the background gas (e.g., species of the background gas molecule) and/or the energy of the collision between the ion and the background gas based at least in part on detecting changes of the spatially filtered light at two or more of the locations within the potential well and a time between the changes in the two or more of the locations.

In an aspect of the method 600, the chamber is part of a quantum information processing system such as the QIP system 500, for example.

In connection with FIGS. 2A-5 and the method 600 in FIG. 6, the present disclosure in generally describes a system that is configured to characterize vacuum (e.g., pressure) in a chamber by making collision rate measurements. Such a system, which may be implemented as part of the QIP system 500 or in connection with the QIP system 500, may include a controller (e.g., the controller 580) configured to generate, inside the chamber (e.g., at the trap 570 in the chamber 550), a potential well having a single, shallow potential region (e.g., the shallow potential region 150) within which an ion is trapped (e.g., the potential well 115*a*, the potential well 115*b*), the shallow potential region having a lowest potential of the potential well. The system may also include an imaging apparatus (e.g., the imaging apparatus 320) configured to optically monitor the ion (e.g., perform a photon count) within the potential well, and to detect, based on the optically monitoring, a movement of the ion away from the shallow potential region in response to a collision with a background gas (e.g., when the ion is kicked into an energetic orbit as a results of the collision). The system may also include a processor (e.g., the processor 545) configured to determine a pressure inside the chamber based on a rate of detected movements of the ion. In one example, the processor may be part of the QIP system 500, while in other implementations the processor is separate but connected to the QIP system 500 in order to determine the collision rate and/or the pressure.

In another aspect of the system of this disclosure, the system includes a trap inside the chamber, the trap being controlled by the controller to generate electric fields that produce the potential well.

In another aspect of the system of this disclosure, the shallow potential region in which the ion is trapped is at a center of the potential well. The shallow potential region may be configured to trap the ion in one or more dimensions. Moreover, the potential well may have a confining potential profile such that the ion returns to the shallow potential region after moving away from the shallow potential region in response to a collision (e.g., returns to its equilibrium position).

In another aspect of the system of this disclosure, the system further includes a filter (e.g., the spatial filter 310), at a location corresponding to the shallow potential region, configured to spatially filter a light produced by the ion (e.g., photons) in response to cooling of the ion, the imaging apparatus is further configured to detect a change in the spatially filtered light at the location corresponding to the shallow potential region in response to the ion moving away from or back to the shallow potential region.

In another aspect of the system of this disclosure, the cooling of the ion is a Doppler cooling of the ion. Such a cooling may be controlled by, for example, the optical controller 520.

In another aspect of the system of this disclosure, the imaging apparatus is further configured to receive the spatially filtered light (e.g., photons) to detect the changes in the spatially filtered light. Moreover, the imaging apparatus is further configured to generate an indication that a collision with the ion has occurred in response to detecting a change in the spatially filtered light. In one example, the communications 330 may simply provide a photon count, however, in another implementation, the communications 330 may be a signal indicating a change in photon count and therefore a collision event.

In another aspect of the system of this disclosure, the system includes filters (e.g., spatial filers 320a, 320b, 320c), at multiple locations within the potential well including a location corresponding to the shallow potential region, configured to spatially filter a light produced by the ion in response to cooling of the ion, and the imaging apparatus includes multiple imaging apparatus and is further configured to detect a change in the spatially filtered light at one or more of the locations within the potential well in response to the ion moving away from or back to the shallow potential region. In this regard, the processor may be further configured to identify the background gas and/or the energy of the collision between the ion and the background gas based at least in part on detecting changes of the spatially filtered light at two or more of the locations within the potential well and a time between the changes in the two or more of the locations.

In another aspect of the system of this disclosure, the chamber is part of a quantum information processing system such as the QIP system 500.

In another aspect of the system of this disclosure, the processor (e.g., the processor 545) is further configured to use time-tagged photon arrival statistics as part of the optically monitoring of the ion to determine the rate of detected movements of the ion.

In another aspect of the system of this disclosure, the processor (e.g., the processor 545) is further configured to use down-sampling of photon counts by recording the mean, minimum, and/or maximum photon count in a particular integration window as part of the optically monitoring of the ion to determine the rate of detected movements of the ion.

In another aspect of the system of this disclosure, the processor (e.g., the processor 545) is further configured to perform post-processing steps to filter data against false detection events.

In another aspect of the system of this disclosure, the system may include an optical controller (e.g., the optical controller 520) that is configured to vary a Doppler cooling power used to cool the ion, which may vary the photons generated by the ion.

In another aspect of the system of this disclosure, the system may include a controller (e.g., the controller 580) that is configured to vary one or more of a DC potential or a radio frequency (RF) potential of a trap inside the chamber (e.g., the ion trap 570 in the chamber 550) to produce the potential well.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for characterizing a vacuum in a chamber, comprising:
    generating, inside the chamber, a potential well having a single, shallow potential region within which an ion is trapped, the shallow potential region having a lowest potential of the potential well;
    optically monitoring the ion within the potential well;
    detecting, based on the optically monitoring, a movement of the ion away from the shallow potential region in response to a collision with a background gas; and
    determining a pressure inside the chamber based on a rate of the detected movement of the ion.

2. The method of claim 1, wherein generating the potential well includes controlling electric fields in a trap inside the chamber to produce the potential well.

3. The method of claim 1, wherein the shallow potential region is at a center of the potential well.

4. The method of claim 1, wherein the shallow potential region is configured to trap the ion in one or more dimensions.

5. The method of claim 1, wherein the potential well has a confining potential profile such that the ion returns to the shallow potential region after moving away in response to the collision with the background gas.

6. The method of claim 1, wherein:
the optically monitoring of the ion includes spatially filtering, at a location corresponding to the shallow potential region, a light produced by the ion in response to cooling of the ion, and
the detecting, based on the optically monitoring, includes detecting a change in the spatially filtered light at the location corresponding to the shallow potential region in response to the ion moving away from or back to the shallow potential region.

7. The method of claim 6, wherein the cooling of the ion is a Doppler cooling of the ion.

8. The method of claim 6, wherein an imaging apparatus receives the spatially filtered light and detects the change in the spatially filtered light.

9. The method of claim 8, further comprising generating, by the imaging apparatus, an indication that a collision with the ion has occurred in response to the detecting of the change in the spatially filtered light.

10. The method of claim 1, wherein:
the optically monitoring of the ion includes spatially filtering, at multiple locations within the potential well including a location corresponding to the shallow potential region, a light produced by the ion in response to cooling of the ion, and
the detecting, based on the optically monitoring, includes detecting a change in the spatially filtered light at one or more of the locations within the potential well in response to the ion moving away from or back to the shallow potential region.

11. The method of claim 10, further comprising identifying the background gas or energy of the collision based at least in part on detecting changes of the spatially filtered light at two or more of the locations within the potential well and a time between the changes in the two or more of the locations.

12. The method of claim 1, wherein the chamber is part of a quantum information processing system.

13. A system for characterizing a vacuum in a chamber, comprising:
a controller configured to generate, inside the chamber, a potential well having a single, shallow potential region within which an ion is trapped, the shallow potential region having a lowest potential of the potential well;
an imaging apparatus configured to optically monitor the ion within the potential well, and to detect, based on the optically monitoring, a movement of the ion away from the shallow potential region in response to a collision with a background gas; and
a processor configured to determine a pressure inside the chamber based on a rate of the detected movement of the ion.

14. The system of claim 13, further comprising a trap inside the chamber, the trap being controlled by the controller to generate electric fields that produce the potential well.

15. The system of claim 13, wherein the shallow potential region is at a center of the potential well.

16. The system of claim 13, wherein the shallow potential region is configured to trap the ion in one or more dimensions.

17. The system of claim 13, wherein the potential well has a confining potential profile such that the ion returns to the shallow potential region after moving away from the shallow potential region in response to a collision.

18. The system of claim 13, further comprising:
a filter, at a location corresponding to the shallow potential region, configured to spatially filter a light produced by the ion in response to cooling of the ion,
wherein the imaging apparatus is further configured to detect a change in the spatially filtered light at the location corresponding to the shallow potential region in response to the ion moving away from or back to the shallow potential region.

19. The system of claim 18, wherein the cooling of the ion is a Doppler cooling of the ion.

20. The system of claim 18, wherein the imaging apparatus is further configured to receive the spatially filtered light to detect the change in the spatially filtered light.

21. The system of claim 20, wherein the imaging apparatus is further configured to generate an indication that a collision with the ion has occurred in response to detecting the change in the spatially filtered light.

22. The system of claim 13, further comprising:
filters, at multiple locations within the potential well including a location corresponding to the shallow potential region, configured to spatially filter a light produced by the ion in response to cooling of the ion, and
wherein the imaging apparatus is further configured to detect a change in the spatially filtered light at one or more of the locations within the potential well in response to the ion moving away from or back to the shallow potential region.

23. The system of claim 22, wherein the processor is further configured to identify the background gas or energy of the collision based at least in part on detecting changes of the spatially filtered light at two or more of the locations within the potential well and a time between the changes in the two or more of the locations.

24. The system of claim 13, wherein the chamber is part of a quantum information processing system.

25. The system of claim 13, wherein the processor is further configured to use time-tagged photon arrival statistics as part of the optically monitoring of the ion to determine the rate of the detected movement of the ion.

26. The system of claim 13, wherein the processor is further configured to use down-sampling of photon counts by recording the mean, minimum, and/or maximum photon count in a particular integration window as part of the optically monitoring of the ion to determine the rate of the detected movement of the ion.

27. The system of claim 13, wherein the processor is further configured to perform post-processing steps to filter data against false detection events.

28. The system of claim 13, further comprising an optical controller configured to vary a Doppler cooling power used to cool the ion.

29. The system of claim 13, further comprising a controller configured to vary one or more of a DC potential or a radio frequency (RF) potential of a trap inside the chamber to produce the potential well.

* * * * *